Oct. 3, 1961
A. L. FERNELIUS
3,002,663
CAMERA SUPPORT
Filed April 28, 1958
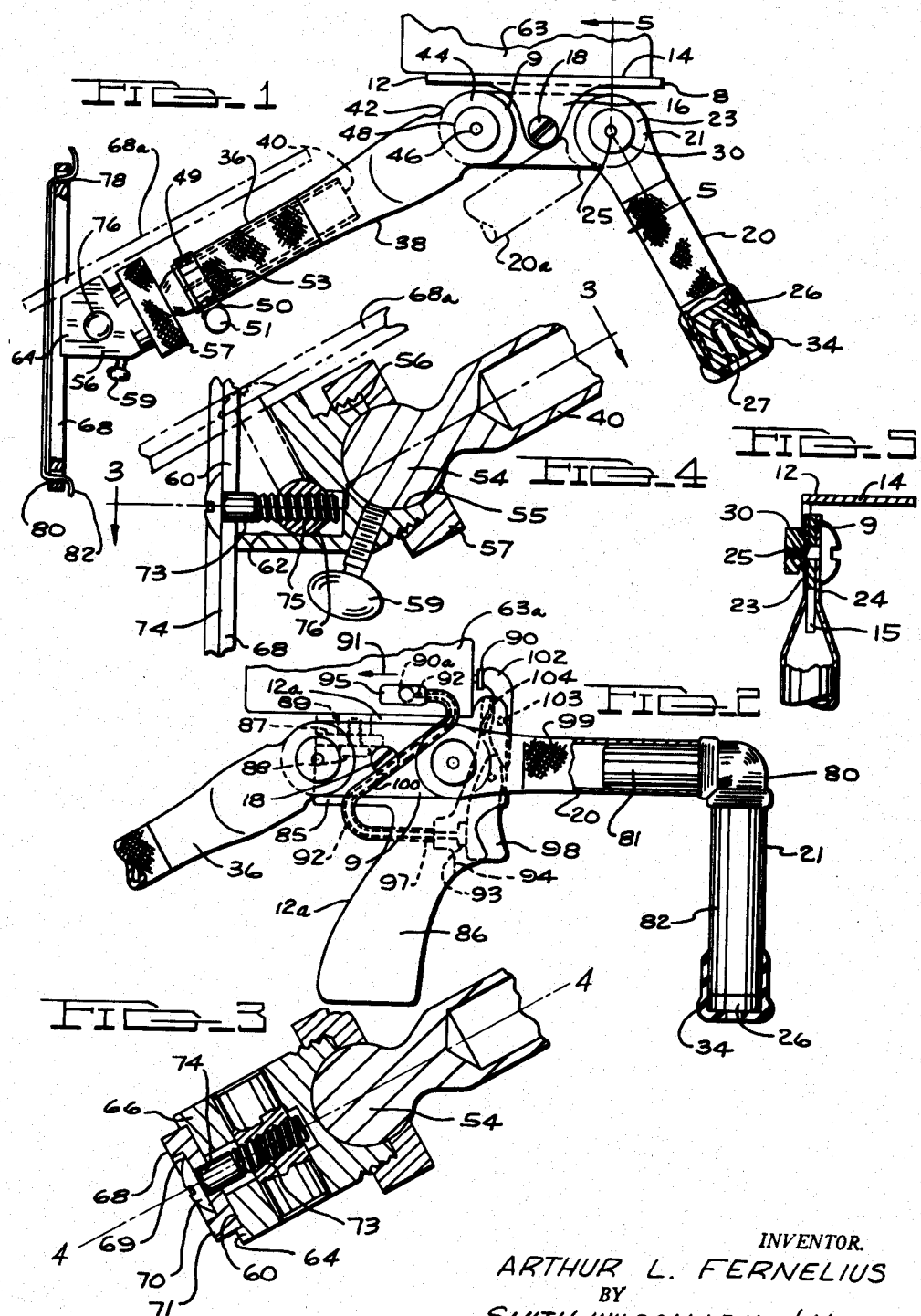
INVENTOR.
ARTHUR L. FERNELIUS
BY
SMITH, WILSON, LEWIS & McRAE

United States Patent Office 3,002,663
Patented Oct. 3, 1961

3,002,663
CAMERA SUPPORT
Arthur L. Fernelius, 14633 Richmond, Wyandotte, Mich.
Filed Apr. 28, 1958, Ser. No. 731,335
8 Claims. (Cl. 224—25)

This invention relates to a support structure particularly designed for holding a movie camera, telescope or other similar sight instrument in any of several desired adjusted positions relative to the eye and body of the user, whereby to enable the user to conveniently and quickly move the instrument from an inoperative "carried" position to the most comfortable "use" position braced against the user's shoulder.

A primary object of the invention is to provide an instrument support structure of the above-identified character wherein the component parts are low cost structures enabling manufacture of the structure in competition with other structures now on the market.

Another object of the invention is to provide an instrument support structure which is easily adjustable to vary the position of the instrument both vertically, laterally and in front-to-rear direction, whereby to enable the support structure to be used by different persons regardless of their size, arm reach, or shoulder configuration.

Another object of the invention is to provide an instrument support structure which can be utilized to support an instrument in "side mount" position or "top mount" position, thereby enabling use of the support structure with most movie cameras now on the market.

Another object is to provide an instrument support structure having a detachable hand grip equippable with a hand grip extension for enabling use of the support structure by persons having extremely long arms or with elongated instruments such as telescopes.

Another object is to provide an instrument support structure having a hand grip and trigger mechanism of such design as to permit the user to actuate the instrument through a cable or push button, thereby enabling the support structure to be utilized with instruments having different types of actuating members.

Another object is to provide an instrument support structure which can be modified for use as a multi-handle structure or as a single handle structure in accordance with the desires of the user.

Another object is to provide a support structure which can be quickly folded into a compact, small volume bundle for storage in small duffle bags or luggage compartments.

Other objects of this invention will appear in the following description and appended claims, reference being had to the accompanying drawings forming a part of this specification wherein like reference characters designate corresponding parts in the several views.

In the drawings:

FIG. 1 is an elevational view with parts broken away of one embodiment of the invention.

FIG. 2 is a view taken in the same direction as FIG. 1 but showing the forward hand grip portion 20 swung up and connected with an auxiliary hand grip portion 21. Also, a camera shutter actuator mechanism has been incorporated into the FIG. 2 device.

FIG. 3 is a sectional view taken substantially on line 3—3 in FIG. 4.

FIG. 4 is a sectional view taken on line 4—4 in FIG. 3.

FIG. 5 is a sectional view on line 5—5 in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to to be understood that the phraseology or terminology employed herein is for the purpose of description and not of limitation.

Referring to the drawings, there is shown a camera support including a support platform 8 formed by a flat vertical wall element 9 and an angle element 12 having a horizontal wall portion 14 and vertical wall portion 16 secured to wall element 9 by means of screw 18. The forward end portion of wall element 9 pivotally carries a hand grip 20 which is conveniently formed as an aluminum tubular member having an upper end portion slit at 15 so as to form a bifurcated end portion 21. The wall portions 23 and 24 formed by the slit are flattened so as to lie closely adjacent the opposite faces of wall element 9. Headed stud 25 extends through wall element 9 and wall portions 23 and 24 into mesh with a knurled nut 30 which serves to clamp hand grip 20 in adjusted pivoted positions around the axis of the stud. The lower end portion of hand grip 20 carries a metal plug 26 which is provided with a threaded bore 27 designed to mesh with the stud formed on the upper portion of the conventional tripod structure (not shown). By this construction the hand grip 20 serves as a convenient means for utilizing the camera support with a conventional tripod structure if so desired. A rubber cup element 34 is pushed onto the lower end portion of tubular hand grip 20 to retain plug 26 therein and to form a manual grip portion when the support structure is utilized without the tripod.

The rear end portion of wall element 9 pivotally carries an adjustable length arm 36. Arm 36 comprises two telescopically connected tubes 38 and 40. Tube 38 is slit at 42 so as to form a bifurcated end structure. The two wall portions 44 formed by this slit are flattened so as to closely engage against opposite faces of wall element 9. A headed stud 46 extends through wall portions 44 and wall element 9 into mesh with a knurled nut 48. It will be understood that pivotal adjustment of arm 36 around the axis of screw 46 may be effected after loosening knurled nut 48.

As previously mentioned, arm 36 includes two tubes 38 and 40. Tubes 38 and 40 are retained in axially adjusted positions by means of a collar 49 having opposed ear-like end portions 50. A screw 51 extends through ears 50 into mesh with a nut (not shown) to draw the ears 50 together and thereby cause collar 49 to clamp tightly on the outer face of tube 38. The lower end portion of tube 38 is formed with a plurality of axially extending slits 53 for causing the clamping pressure from collar 49 to be effective to force the tube 38 lower end sections into tight clamping engagement with the outer face of tube 40. It will be understood that adjustment of tube 40 within tube 38 is effected after first loosening screw 51.

The lower end portion of tube 40 is extended downwardly to form a spherical projection 54 which is adapted to rotate within a spherical seat 55 formed by connector bracket 56. A retainer element 57 is screwed onto bracket 56 to prevent movement of spherical projection 54 away from seat 55. Set screw 59 locks projection 54 in adjusted positions relative to seat 55.

Bracket 56 is formed as a solid aluminum element having a flat base surface 60 and a cavity 62 extending inwardly therefrom. Surface 60 is spaced inwardly from the rear limit of the connector bracket so as to form vertically extending flanges 64 and 66. Surface 60 and the flanges 64 and 66 cooperate together to form a track structure for slidably engaging a vertically elongated brace element 68 adapted to engage against the human shoulder for enabling the camera user to support movie camera 63 in a steady position while still enabling him to move the camera in various directions in accordance with the action being photographed.

Brace element 68 is provided with an elongated recess 69 which serves to prevent the head of screw 70 from projecting rearwardly beyond the rear face 71 of the brace element. By this arrangement the head of the screw is prevented from digging into the shoulder of the user so as to cause discomfort or pain. The screw is provided with a threaded shank portion 73 which extends through a vertically elongated slot 74 in the brace element into threaded bore 75 of a cylindrical anchor pin element 76 rotatably seated within connector bracket 56. It will be understood that by loosening the screw brace element 68 may be slid up and down in the trackway formed by surfaces 60, 64 and 66 so as to change the position of the brace element to the position most comfortable for the user. The upper and lower end portions of brace element 68 are provided with slots 78 and 80 for having extended therethrough a leather strap element 82. Only a portion of strap element 82 is shown in the drawings, but it will be understood that the strap is constructed with a conventional buckle structure so as to be adjustable in length. In use of the camera support the user extends his arm through the strap so as to position the shoulder-engaging brace element 68 against the user's shoulder. The strap serves to partially support the weight of the camera and supporting structure during the picture taking operation. Between shots the user may swing the camera and its support structure downwardly so as to allow the strap to carry the total weight in the manner of a conventional golf bag strap.

When it is desired to collapse and store the camera support structure in a compact space hand grip 20 is swung to the dotted line position 20a, and shoulder-engaging brace element 68 is moved to the dotted line position 68a adjacent arm 36. Strap element 82 may be wrapped around the entire structure to form a compact small volume bundle for easy storage in small spaces such as in small duffle bags or suitcases. In order to position brace element 68 in its dotted line position 68a screw 70 is loosened from bore 75 sufficiently so that when brace element 68 is moved straight upwardly in track 64, 66 it can pivot into the dotted line position 68a. The rotatable mounting of pin 76 allows the desired pivotal movement of the brace element with a corresponding shift in the position of the screw 72 around the axis of pin 76.

In use of the FIG. 1 camera support the user adjusts the position of tube 40 within tube 38 by means of screw 51. Hand grip 20 is adjusted to a desired comfortable position by actuation of nut 30, and brace element 68 is adjusted vertically and rotatably by actuation of screws 70 and 59. In this connection base element 68 may be quickly adjusted rotatably about the axis of arm 36 and longitudinally along the arm 36 axis by loosening screw 51, the rotary adjustment being accomplished by a turning motion of tube 40 within tube 38. By utilizing the various adjustments the user can position the camera in the location most comfortable for him while still enabling the camera to be held in a steady controllable position for easily moving the camera about in accordance with the action taking place.

In some situations, as for example when the user has a long arm reach, it is more convenient to have the forward hand grip located well forward from the position shown in FIG. 1. In such situations hand grip 20 can be pivoted upwardly to the FIG. 2 horizontal position and equipped with hand grip extension 80. Extension 80 comprises a tubular element 81 tightly fitting within element 20 and a downwardly extending hand grip section 82. In use of the FIG. 2 apparatus the user grasps hand grip portion 82 instead of portion 20 as with the FIG. 1 arrangement.

The FIG. 1 camera support includes a horizontal wall portion 14 for seating against the lower surface of the camera. This arrangement is known as the "top mount" arrangement and is suitable for many cameras. However with some types of cameras, such as the Bolex, the camera must be supported in a "side mount" position. In utilizing the illustrated apparatus for supporting a camera in "side mount" position the angle element 12 is removed, and the central opening of wall element 9 is employed to lock the support platform element 9 onto a camera-engaging member 12a.

Member 12a includes a generally vertical wall portion 85 and hand grip portion 86. A horizontal wall portion 87 extends from wall portion 85 to receive a manually actuable screw 88 for holding a movie camera 63a against member 12a. The camera is provided with a threaded sleeve 89 for meshing engagement with screw 88. Stud 25 and screw 18 extend through wall portion 85 to secure member 12a onto wall element 9.

Camera 63a is provided with a push button 90 and pin 90a for operating the shutter and film motor. Pin 90a is moved horizontally in the arrow 91 direction by means of a flexible wire 92 which extends within a flexible tube 100 to connection with a button 93 located in recess 94 formed in member 12a. The upper end of tube 100 is secured to an adapter 95 which removably attaches to the camera, and the lower end of tube 100 is secured within a bore 97 formed in member 12a.

In operation, when trigger 98 is pulled clockwise about its pivot pin 99 wire 92 is caused to move pin 90a in the arrow 91 direction so as to operate the camera.

Trigger 98 engages a lever 102 which pivots on pin 103. A leaf spring 104 normally holds the trigger and lever in their illustrated positions. However, when the trigger is pulled clockwise about its pivot the lever is pivoted counterclockwise so as to depress push button 90 and thereby operate the camera.

The structure of member 12a is such as to permit use with the cameras having the cable-actuated operator 90a or the push-button operator 90. Member 12a also serves to cooperate with hand grip 82 in forming a two handled structure which gives the user maximum control of the camera, both during stationary shots and panoramic shots.

As previously indicated, the invention is applicable for use in supporting other eye-sighted devices than movie cameras. For example, the invention can be utilized with telescopes, firearms, or synchronized camera-firearm combinations. The term "sight instrument" is used herein to include cameras, telescopes and firearms and combinations thereof.

I claim:

1. A sight instrument support structure comprising an instrument support platform having a vertical wall element; a tubular hand grip positioned adjacent the forward portion of said platform and having flattened end portions positioned against opposite surfaces of said vertical wall element; clamp means including a threaded element extended through said vertical wall element and flattened end portions for holding said hand grip in adjusted pivoted positions around the threaded element axis; an adjustable length arm pivotally connected with a rear portion of a support platform; a shoulder-engaging brace element; a connector carried on the free end portion of the adjustable length arm; and means securing the brace element on the connector for vertical adjustment therealong in accordance with the position of use most comfortable for the user.

2. A sight instrument support structure comprising an instrument support platform having a vertical wall element; a hand grip carried by the forward portion of said support platform; a first tube having a bifurcated end portion flattened so as to present flat wall portions against opposite faces of said vertical wall element; a pivot screw extending through the wall portions and vertical wall element; threaded means engaging said screw to clamp the tube in adjusted positions relative to the support platform; a second tube telescopically carried by the first tube for cooperating therewith in providing an adjustable length arm; a shoulder-engaging brace element; a connector carried by the free end of said second tube; and means securing the shoulder-engaging brace element onto the connector for vertical adjustment of the brace element in accordance with the position of most comfort to the instrument user.

3. A sight instrument support structure comprising an instrument support platform; a hand grip carried by the forward portion of said support platform; an arm pivotally carried by the rear portion of said support platform; a shoulder-engaging brace element having an elongated slot therein; a connector bracket carried by the free end portion of the adjustable length arm; an anchor element rotatably positioned within said connector bracket and having a threaded opening therein; and a screw having a head portion positioned against the brace element and a threaded shank portion extending through the slot into the threaded opening in the anchor element; whereby the screw can be located to permit vertical adjustment of the brace element and pivotal positionment of the brace element into a location alongside of the arm for compact storage.

4. A sight instrument support structure comprising an instrument support platform; a hand grip carried by said support platform; an adjustable length arm pivotally connected with said support platform; a shoulder-engaging brace element; a connector carried on the free end of the adjustable length arm; means fastening the shoulder-engaging brace element into the connector; and means permitting vertical adjustment of the brace element along the connector to the position most comfortable for the user; said hand grip including a tubular element extending forwardly from a pivotal connection with the support platform, and an extension member including a generally horizontal arm portion removably telescoped onto the tubular element and a depending hand grip portion; whereby to permit the extension to be removed when it is desired to pivot the tubular element downwardly for use as a hand grip portion.

5. A sight instrument support structure comprising an instrument support platform; a hand grip carried by said support platform; an arm pivotally connected with said support platform; a shoulder-engaging brace element; a connector carried on the free end of the arm; means fastening the shoulder-engaging brace element onto the connector; and means permitting vertical adjustment of the brace element along the connector to the position most comfortable for the user; said platform including a vertical wall element; and an angle member having one leg thereof detachably secured onto one face of said wall element; whereby to allow the other leg of the angle member to seat beneath an instrument in a "top mount" position, or to allow the vertical element to support an instrument in a "side mount" position when the angle member is removed.

6. A sight instrument support structure comprising an instrument support platform; a hand grip carried by said support platform; an adjustable length arm pivotally connected with said support platform; a shoulder-engaging brace element; a connector carried on the free end of the adjustable length arm; means fastening the shoulder-engaging brace element onto the connector; and means permitting vertical adjustment of the brace element along the connector to the position most comfortable for the user; said hand grip including a tubular element extending forwardly from a pivotal connection with the support platform, and an extension member including a generally horizontal arm portion removably telescoped onto the tubular element and a depending hand grip portion.

7. A sight instrument support structure comprising an instrument support platform, including a vertical plate extending in a front-to-rear direction and having openings adjacent both its front and rear ends; a front hand grip comprising a first tube having a bifurcated end portion flattened to define flat wall portions located against opposite faces of the vertical wall element adjacent its front end; a pivot screw extending through the flat wall portions and vertical plate; threaded clamp means engaging said screw to clamp the hand grip in adjusted positions relative to the vertical plate; a second tube located generally rearwardly of the plate and having a bifurcated end portion flattened to define second flat wall portions positioned against opposite faces of the vertical wall element adjacent its rear end; a second pivot screw extending through the second flat wall portions and vertical plate; second threaded clamp means engaging said second screw to clamp the second tube in adjusted positions relative to the vertical plate; a shoulder-engaging brace element; and connector means between the brace element and the second tube.

8. A sight instrument support structure comprising a vertical instrument support structure including a vertical wall element having front and rear portions; a hand grip structure having a pivotal connection with a forward portion of said vertical wall element; an arm having a pivotal connection with a rear portion of said vertical wall element; a shoulder-engaging brace element; and means interconnecting the arm and shoulder-engaging brace element; the aforementioned instrument support structure including an angle member having one leg thereof detachably secured onto one face of the vertical wall element, whereby to allow the other leg of the angle member to seat beneath an instrument in a "top mount" position, or to allow the vertical wall element to support an instrument in a "side mount" position when the angle member is removed therefrom.

References Cited in the file of this patent
UNITED STATES PATENTS

| | | |
|---|---|---|
| 817,207 | Wheeler | Apr. 10, 1906 |
| 903,682 | Cumpston | Nov. 10, 1908 |
| 1,900,020 | McCandless | Mar. 7, 1933 |
| 2,703,691 | Minnis | Mar. 8, 1955 |
| 2,712,779 | Tolcher | July 12, 1955 |
| 2,753,778 | Tolcher | July 10, 1956 |

FOREIGN PATENTS

| | | |
|---|---|---|
| 666,808 | Great Britain | Feb. 20, 1952 |